L. F. JOHNSON.
ELECTRIC MOTOR.
APPLICATION FILED SEPT. 22, 1904.

918,861.

Patented Apr. 20, 1909.
2 SHEETS—SHEET 1.

L. F. JOHNSON.
ELECTRIC MOTOR.
APPLICATION FILED SEPT. 22, 1904.
918,861.
Patented Apr. 20, 1909.
2 SHEETS—SHEET 2.
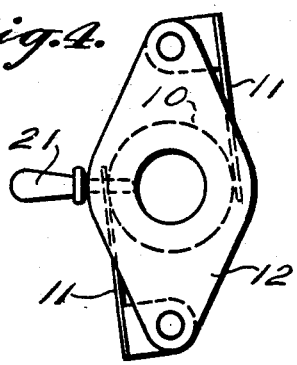
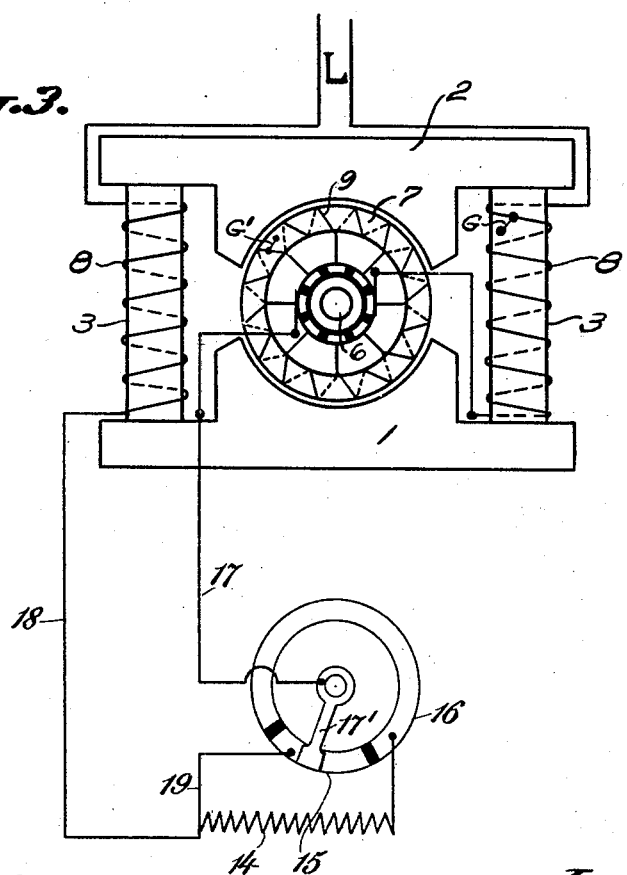
Witnesses:
Rudow Rummler
Glen C. Stephens
Inventor,
Louis F. Johnson,
by Rummler & Rummler
Attorneys

UNITED STATES PATENT OFFICE.

LOUIS F. JOHNSON, OF CHICAGO, ILLINOIS, ASSIGNOR, BY MESNE ASSIGNMENTS, TO P. & O. ELECTRIC CO., A CORPORATION OF ARIZONA TERRITORY.

ELECTRIC MOTOR.

No. 918,861.   Specification of Letters Patent.   Patented April 20, 1909.

Application filed September 22, 1904. Serial No. 225,449.

*To all whom it may concern:*

Be it known that I, LOUIS F. JOHNSON, a citizen of the United States of America, and a resident of Chicago, in the county of Cook and State of Illinois, have invented certain new and useful Improvements in Electric Motors, of which the following is a specification.

Figure 2:
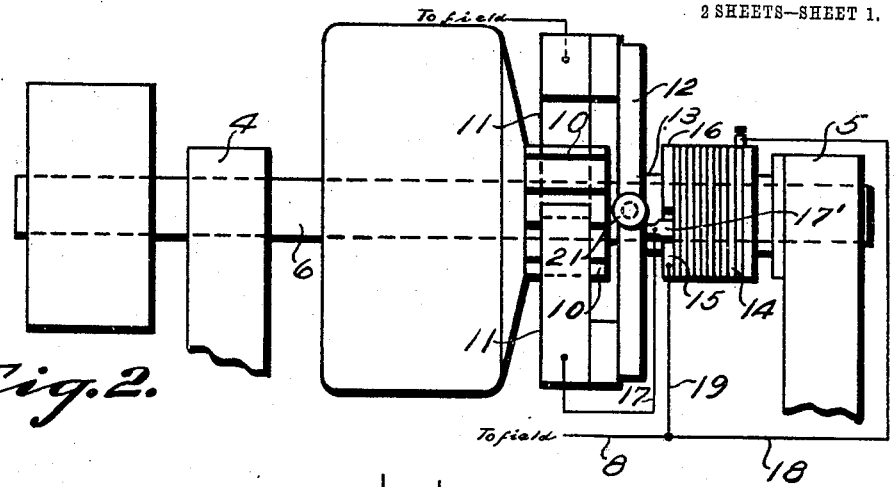
Figure 1:
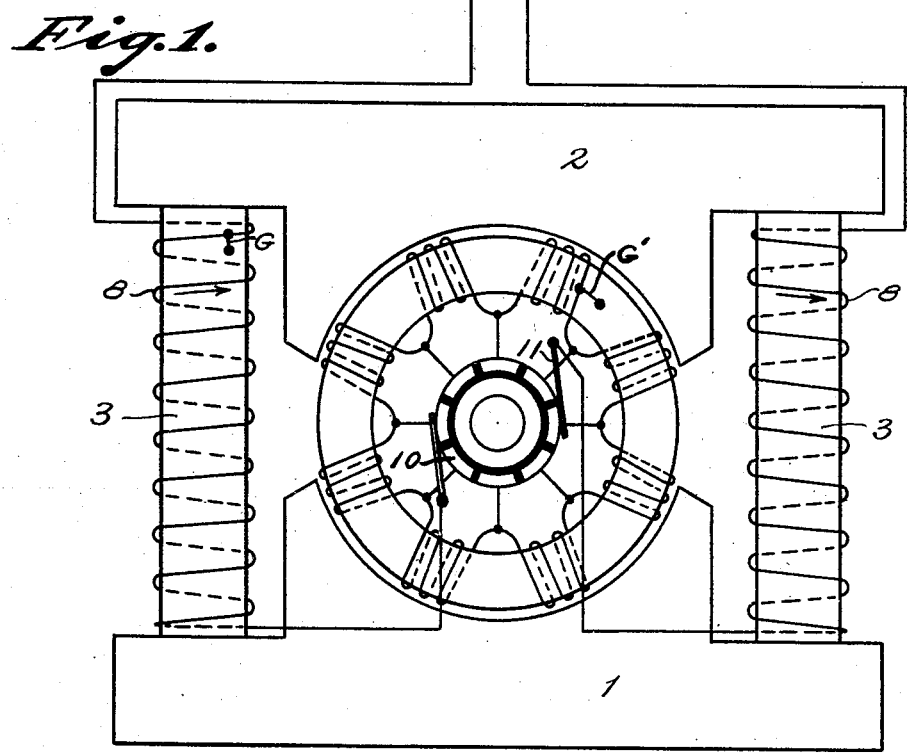

The main objects of my invention are to provide an electric motor capable of being controlled and reversed by a simple movement of the brushes; to provide suitable means for preventing short circuiting of the armature of an electric motor by moisture; to provide in the winding of electric motors one or more secondary or auxiliary paths of high resistance adapted to take up an excessive flow of current due to shifting of the brushes out of their normal position, sudden changes of the load or sudden reversals of the current; to provide improved arrangement of the material of the field magnets to obtain a combination which will readily saturate with magnetism, and while demagnetizing quickly under reversals of the current, will, when the brushes are turned to the neutral position, retain a large quantity of residual magnetism and tend to cause the motor to operate as a generator, thus forming resistance for quickly stopping the rotation of the armature; and to provide suitable grounding of the field windings and the armature windings to the framework of the motor so as to cause a part of the current to be deflected and flow through the framework, setting up induced currents serving as scattered internal resistance antagonistic to the normal flow of current through the windings, whenever such windings are subjected to a sudden rush of current endangering the insulation thereof. I accomplish these objects by the device shown in the accompanying drawings, in which:

Figure 1 is a diagrammatic view of a motor constructed according to my invention. Fig. 2 is a side elevation of the armature and brush holder, showing a choke coil in circuit therewith and omitting the field magnets and certain other parts of the supporting frame. Fig. 3 is a diagrammatic view showing the method of connecting the choke coil. Fig. 4 is a detail view showing the construction of the brush holder.

In the form shown in the drawings, the field magnet consists of a pair of massive pole pieces 1 and 2 opposed to each other, and connected together by means of cylindrical cores 3. The field magnet is rigidly secured to a suitable base, which is not shown in the drawing, and to which are also secured the bearings 4 and 5 for the armature shaft 6. The armature is of the Gramme ring type, comprising an annular core 7 consisting of laminated rings of annealed iron bound together and rigidly secured to the shaft 6 by means of a suitable spider not shown in the drawing. Any form of winding which is suitable for motors of this type may be used. In the particular form shown, the field coils 8 and 9 are connected in series with the armature winding 9, which consists of a series of adjacent coils connected together and having their junctions connected with the bars of the commutator 10 in the usual way.

One of the field coils is grounded on the core of the field at G a point near the junction of such coil with the line. One of the convolutions of the armature circuit is also grounded in a similar manner at G' by being connected with the core of the armature. These connections between the windings and their cores are preferably made by means of short conductors of high resistance. In small motors a needle driven through the copper wire and into the core has proven to be a good connection for this purpose. This grounding of the windings forms an auxiliary path of high resistance, normally deflecting only a slight portion of the current; but in cases where the winding is subjected to an excessive flow of current, the windings become heated somewhat causing their resistance to become more nearly equal to that of the said auxiliary path, which then deflects a larger proportion of the current and thus assists the windings in taking care of such excessive flow and prevents them from becoming short circuited and burned out through failure of their insulation.

The brushes 11 are mounted on a brush holder 12 which is journaled on a sleeve 13 surrounding the shaft 6 and secured to the bearing 5. The brush holder 12 is adapted to be rotated through an angle of more than 180 degrees around the sleeve 13 and is provided with a handle 21 which is threaded into the holder 12 and adapted to be screwed into and out of engagement with the sleeve 13 for securing the brush holder 12 in a fixed position. This shifting of the brush holder 12 permits the brushes to be moved from a neutral position relatively of the poles 1 and 2 to different angular positions in either direction from such neutral position, thereby varying the number of magnetic lines of force cut by each branch of the armature circuit and consequently increasing or decreasing the speed of the motor. It will be seen that setting the brushes at one side of the neutral point will cause the armature to rotate in a certain direction, while if the brushes are turned to the opposite side of the neutral point, the direction of flow of the current through the armature coils, will be reversed without reversing the direction of the flow of current through the field coils, causing the armature to rotate in the opposite direction.

When using current of high voltage, I supplement the grounding of the armature and field windings with a choke coil 14 which is shown mounted on the sleeve 13 and is so connected with the brushes as to be brought into and out of the armature circuit when the brushes are moved out of or into their neutral position. When the brushes are in their neutral position, the resistance of the choke coil serves to diminish the excessive flow of current in the armature circuit. As shown in Fig. 2 two annular conductors 15 and 16 are secured to the sleeve 13 near the brush holder 12. The conductors 15 and 16 are insulated from the sleeve and from each other and are adapted to be engaged by a brush or finger 17' on the brush holder. The finger 17' is electrically connected with one of the brushes 11. One end of the choke coil is connected to the conductor 16, while its other end is connected by the wire 18 to one of the field coils 8. The conductor 15 is connected directly to said field coil 8 by the wire 19. It will be seen that when the finger 17' is in contact with the conductor 15, the choke coil 14 will not be in circuit; and when the finger 17' engages the conductor 16, the choke coil 14 will be brought into the circuit and will serve through its resistance to reduce the flow of current through the armature. The conductors 15 and 16 are so arranged that the conductor 15 will be engaged by the finger 17' when the brushes are in the neutral position, while the conductor 16 will be engaged by the finger 17' when the brushes are in positions away from the neutral position, thus avoiding an excessive rush of current through the armature circuit and preventing sparking when the brushes are out of their neutral position.

The cores are constructed of soft annealed iron which will readily saturate with magnetism and at the same time quickly become demagnetized when the current is changed. The pole pieces 1 and 2, on the contrary, are constructed of the cheapest grade of cast iron which is hard and retains a considerable amount of residual magnetism after the current is cut off. This residual magnetism serves to resist the rotation of the armature when the current is shut off and the motor is thus quickly brought to a standstill.

In operation, the motor is connected with the line by a switch which is not shown in the drawings. The speed and direction of rotation of the armature are all controlled by setting the brushes through the movement of the handle 21, thus accomplishing the control by varying the direction of the current in the armature coils relatively of the poles of the field.

Other features of the operation of the device shown will be readily understood from the foregoing description.

It will be understood that numerous details of the construction shown may be altered without departing from the spirit of my invention, and it will also be understood that my invention may be applied to other types of motor or windings of other character.

What I claim as my invention and desire to secure by Letters Patent, is:

1. In a device of the class described, the combination of an iron core, an insulated conductor wound on said core for magnetizing the same, and suitable conductors of relatively high resistance connecting the core as shunt of its windings for deflecting a portion of the current when the windings are heated by an excessive current, substantially as described.

2. A motor having field cores and an armature core in electrical connection with each other, a field winding grounded on the field magnet, and an armature winding grounded on the armature core, substantially as and for the purpose specified.

3. In a motor, the combination of a field magnet, an armature core, windings on said field magnet and said armature core, a conductor of high resistance connecting the field winding to the field magnet, and a conductor of high resistance connecting the armature winding and the armature core, substantially as described.

Signed at Chicago this 20th day of September, 1904.

LOUIS F. JOHNSON.

Witnesses:
   EUGENE A. RUMMLER,
   GLEN C. STEPHENS.